United States Patent Office 3,155,888
Patented Nov. 3, 1964

3,155,888
CAPACITOR AND METHOD OF MAKING SAME
Edward S. Blake and William C. Hammann, Dayton, Ohio, assignors to Monsanto Company, a corporation of Delaware
No Drawing. Filed Sept. 29, 1959, Ser. No. 843,057
13 Claims. (Cl. 317—258)

This invention relates to the use of polyphenyl ethers as dielectric compositions at elevated temperatures, and also it relates to means in which the polyphenyl ethers are utilized as dielectric materials for high temperature applications.

Many compositions are known today which can be used as dielectric materials, but in general these materials are employed at relatively low temperatures, consequently it is not important that the compounds also be stable and/or have relatively low vapor pressures at elevated temperatures. At elevated temperatures of use, for example, at least 500° F., it is important that the material being used as a dielectric composition have a relatively low vapor pressure; otherwise, considerable material is lost through evaporation. Furthermore, the compound should be stable at the elevated temperature in order to preserve its dielectric characteristics. The present invention is concerned with providing materials which have exceptional stability at elevated temperatures, relatively low vapor pressure, and good dielectric characteristics.

Accordingly, an object of this invention is to provide means in which polyphenyl ethers are employed as dielectric materials.

Another object is to provide a method by which capacitors and the like can be operated at elevated temperatures for substantially long periods of time.

Other objects and advantages of this invention will become apparent from the following description and explanation thereof.

In accordance with the present invention, a polyphenyl ether containing at least three phenyl groups is employed as the dielectric material in capacitors or the like. For the purpose of this specification and the appended claims, "a polyphenyl ether" includes compounds which not only contain at least three phenyl groups but is intended to designate in a generic sense both unsubstituted and substituted compounds. The polyphenyl ethers of the present invention can be illustrated by the following formula:

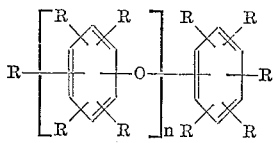

wherein $n$ is an integer of at least 2 and can be as high as 9, and each R is selected from the group consisting of hydrogen, alkyl, phenyl, nitrile, and halogen. Preferably the alkyl radicals are selected from the group of alkyl radicals containing up to 12 carbon atoms and more preferably still from the group containing up to 8 carbon atoms. The halogen atoms through atomic number 35 are suitable for the herein disclosed application, i.e. fluorine, chlorine, and bromine, but in general chlorine is the preferred halogen substituent. The phenyl groups in the polyphenyl ethers are interconnected by means of oxygen at the ortho, meta or para position or any combination of the three linkages.

Specific illustrative examples of the polyphenyl ethers are o-diphenoxybenzene, m-diphenoxybenzene, p-diphenoxybenzene, p-bis(p-isopropylphenoxy)benzene, bis(p-phenoxyphenyl) ether, tetrachlorinated p-diphenoxybenzenes such as bis(2,3-dichlorophenoxy)-benzene, p-bis(p-chlorophenoxy)benzene, p-bis(p - methoxyphenoxy)benzene, hexachloro-p-bisphenoxybenzenes such as bis(2,3,5-trichlorophenoxy)benzene, p-bis(p-phenoxyphenoxy)benzene, o-tolyl p-phenoxyphenyl ether, o-cyclohexylphenyl p-phenoxyphenyl ether, p-bis(o-toloxy)-benzene, p-bis(p-ethylphenoxy)benzene, p - bis(p-tert-butylphenoxy)-benzene, p-bis(p-octylphenoxy)benzene, 2,4-di-sec-amylphenyl p-phenoxyphenyl ether, p-bis(5-isopropyl-2-methylphenoxy)benzene, 2,4-bis(m-toloxy)toluene, 2,4 - bis(3-ethyl-5-methylphenoxy)toluene, bis[p-(o-toloxy)phenyl] ether, m-bis(m-ethylphenoxy)benzene, m-tert-butylphenyl m-phenoxyphenyl ether, m-cumylphenyl m-phenoxyphenyl ether, m-bis(p-cyclopentylphenoxy)benzene, o - chlorophenyl o-phenoxyphenyl ether, p-bis(p-cyanophenoxy)-benzene, bis(m-phenoxyphenyl) ether, m-bis(m-phenoxyphenoxy)benzene, bis[m-(m-phenoxyphenoxy)phenyl] ether, m-bis[m-(m-phenoxyphenoxy)phenoxy]benzene, bis[p - {p - [m-(m - phenoxyphenoxy)phenoxy]phenoxy} phenyl] ether,
bis[m - {m - [m-(m-phenoxyphenoxy)phenoxy]phenoxy} phenyl] ether,
bis{m - [m-{m-[m-(m-chlorophenoxy)phenoxy]phenoxy} phenoxy]phenyl}-ether,
bis{p - [p - {m - [m - (m - chlorophenoxy)phenoxy] phenoxy}phenoxy]phenyl}ether,
bis{m - [m - {m - [m - (m-tert-butylphenoxy)phenoxy] phenoxy}phenoxy]phenyl}ether,
bis{m - [m - {m - [m - (3,5-dichlorophenoxy)phenoxy] phenoxy}phenoxy]phenyl}ether, m-bis(o-bromophenoxy)benzene, bis[m - (m - bromophenoxy)phenyl] ether, m-bis(pentachlorophenoxy)benzene, p-fluorophenyl m-phenoxyphenyl ether, 2,4 - bis(p - ethylphenoxy)chlorobenzene, p-bis(o-phenoxyphenoxy) - benzene, m-bis(o-phenoxyphenoxy)benzene, o-bis(o-phenoxyphenoxy)benzene, m-phenoxyphenyl o-phenoxyphenyl ether, p-bis(o-chlorophenoxy)benzene, and the like.

From the illustrative structural formula and examples given hereinabove it will be apparent that the term "phenyl" also embraces the term "phenylene" as to the aromatic ring components of the polyphenyl ether chain. Thus, it is clear that the polyphenyl ethers employed in the instant invention can also be generically classed as poly(oxyphenylene)benzenes.

In general, the polyphenyl ethers of the present invention are prepared by reacting the sodium or potassium salt of a phenol with a dihalobenzene, and conversely a monohalobenzene, e.g. bromobenzene, m-bromotoluence, m-phenoxybromobenzene, and the like, can be reacted with a dihydroxy aromatic compound, e.g. a dihydroxyphenyl ether, such as bis(2-hydroxyphenyl) ether, and the like. When the dihalo compound contains bromine, it is preferred to use finely divided copper as the catalyst. On the other hand, when the dihalo compound is dichlorobenzene, it is preferred to use a mixture of copper, cuprous chloride and potassium iodide. The temperature of the reaction can be varied from, about 190° C. to about 260° C. and higher and preferably is varied from about 220° C. to about 250° C. and the time in which the reaction is completed may vary from about 2 to about 5 hours or longer.

For the preparation of a polyphenyl ether containing three phenyl groups, about 2.2 moles of the sodium or potassium salt of phenol are reacted with 1 mole of dichlorobenzene in the presence of about 0.02 mole of copper, about 0.02 mole of cuprous chloride and about 0.02 mole of potassium iodide. When dibromobenzene is used in place of the dichlorobenzene, it is preferred to use about 0.02 mole of finely divided copper as the catalyst. In a similar manner the preparation of a polyphenyl ether containing four phenyl groups can be achieved by reacting 1 mole of a dihalodiphenyl ether, e.g. bis(p-bromophenyl) ether (which in turn can be prepared by the bromination of diphenyl ether), with about 2.2 moles of the sodium or potassium salt of phenol. When using a dichlorodiphenyl ether, it is preferred to use the mixture of copper, cuprous chloride and potassium iodide in the amounts indicated hereinbefore in the preparation of polyphenyl ether containing three phenyl groups, whereas when a dibromodiphenyl ether is employed about 0.02 mole of finely divided copper is employed as the catalyst. To prepare a polyphenyl ether containing five phenyl groups in the molecule, about 2.2 moles of the sodium or potassium salt of a phenoxyphenol are reacted with 1 mole of dihalobenzene, using the temperature, time and catalyst indicated above. Similarly, the preparation of a polyphenyl ether containing six or more phenyl groups can be effected by reacting 1 mole of a dihalodiphenyl ether with about 2 or more moles of the potassium or sodium salt of a phenoxyphenol, under the conditions specified hereinabove. The alkyl- and halogen-substituted polyphenyl ethers are obtained by using one or both of the reactants which contain the desired alkyl and/or halogen substituents. Furthermore, the chlorine or bromine substituted polyphenyl ethers can be obtained by selecting one or both reactants with the desired halogen substituents or the halogen-substituted polyphenyl ethers also can be obtained by direct halogenation. The position of the phenyl groups relative to the interlinking oxygen atom can be predetermined by careful selection or reactant materials. By such a selection it is possible to obtain ortho, meta or para polyphenyl ethers or mixtures of the foregoing arrangements in the same molecule.

The preparation of the polyphenyl ethers is illustrated by the following examples.

EXAMPLE 1

Bis(m-phenoxyphenyl) ether was prepared by taking a mixture of 55.7 g. of m-phenoxyphenol, 15.7 g. of potassium hydroxide and 50 ml. of xylene and heating the same at reflux until 6 ml. of water had ben collected in a Dean-Stark trap. The xylene was removed by distillation and 60 g. of m-bromophenyl phenyl ether and 1 g. of copper powder were added. The reaction mixture was heated at 240 to 250° C. for 20 hours. Thereafter it was combined with benzene and washed with two 250-ml. portions of 5% potassium hydroxide solution and three 250-ml. portions of water and dried over anhydrous sodium sulfate. This mixture then was subjected to distillation to remove the solvent and recover the bis(m-phenoxyphenyl) ether therefrom.

EXAMPLE 2

*Chlorination of p-bisphenoxybenzene.*—Chlorine gas was bubbled through 131 g. of p-bisphenoxybenzene at 130° C. with stirring until 16 g. of chlorine had been absorbed. The product was taken up in 400 ml. of benzene and washed with three 100-ml. portions of 10% aqueous sodium hydroxide solution and three 100-ml. portions of water. Thereafter the product was stripped of benzene solvent and subjected to a fractional distillation to obtain monochlorobisphenoxybenzene.

EXAMPLE 3

*Dichloro-p-bisphenoxybenzene.*—Chlorine was bubbled at 21° C. through a solution of 131 g. of p-bisphenoxybenzene and 4 g. of anhydrous ferric chloride in 350 ml. of carbon tetrachloride. After about 2 hours, about 38 g. of chlorine was absorbed. Then the solution was filtered, washed with 300 ml. of 5% aqueous sodium carbonate solution and two 300-ml. portions of water and then dried over sodium sulfate. The reaction mass was then distilled through a fractionation column, crystallized and the product separated, which product was identified as p-bis(p-chlorophenoxy)benzene.

EXAMPLE 4

One hundred five grams of m-phenoxyphenol and 29.8 g. of potassium hydroxide were heated together to effect the formation of the potassium m-phenoxyphenoxide derivative. Thereafter 30 ml. of toluene were added to the mass and the mixture refluxed under a Dean-Stark trap until the reaction mass was dehydrated. The toluene was removed from the reaction mass by distillation at a temperature of 220° C. After the toluene was removed, 1 g. of copper powder and 47.8 g. of m-bromochlorobenzene were added thereto. The reaction mass was heated to 250° C. over a 20-minute period, then was heated for an additional 4-hour period at 250 to 260° C. At the end of the reaction the reaction mass was taken up in 200 ml. of water together with 400 ml. of benzene. The mixture was washed with three 250-ml. portions of 5% aqueous sodium hydroxide solution and two 250-ml. portions of water. The desired fraction was separated from the product and was found to be m-chlorophenyl m-phenoxyphenyl ether.

The polyphenyl ethers disclosed and illustrated hereinbefore now have been found to be useful in various types of capacitors. To provide a fuller understanding of this invention, reference will be made to specific examples of capacitors. In the following description, the novel capacitor is made in a similar manner for all the examples and, therefore, it is not essential that separate examples be submitted for each of the various polyphenyl ethers, disclosed and discussed hereinabove, as the specific dielectric material in the said capacitor.

Three sheets of tissue paper of the Kraft capacitor type are stacked one upon the other and a thin aluminum foil having a thickness of 0.0003" is laid on the top tissue paper. A stack of three more sheets of tissue paper is then place on the foil and another sheet of the foil is placed thereon. A third stack of three sheets of tissue paper is placed on the second metal foil and, in turn, another layer of metal foil is placed thereon. The alternating layers of metal foil and tissues are then wound into a cylindrical roll. The cylindrical roll is placed in a container and the electrical wire is connected to the metal foils. The assembly containing the cylindrical roll is then dried in a heated vacuum oven, and thereafter, one of the polyphenyl ethers disclosed hereinabove is added to the container in a quantity sufficient to impregnate thoroughly the paper content of the cylindrical roll. The container is then sealed with due precautions to avoid contamination of the materials, to provide a capacitor unit. It will be understood that other porous sheets, such as linen or paper, can be interleaved with the plurality of sheets of metal foil, such as aluminum or tin, to effect the formation of the desired capacitor. The porous sheets can of course be impregnated with the disclosed class of polyphenly ethers prior to assembly with the metal foil, or subsequently impregnated by any suitable means, such as vacuum impregnation and the like.

The suitability of the disclosed class of polyphenyl ethers for use as dielectric materials has been determined by measuring the dielectric constants, power factors and resistivities thereof. These illustrative results are reported in the table below.

*Table 1*

| Compound | Dielectric Constant at 25° C. | | Power Factor at 25° C. | | D. C. Resistivity |
|---|---|---|---|---|---|
| | 1 kc. | 10 kc. | 1 kc. | 10 kc. | |
| Bis(m-phenoxyphenyl) ether | 4.37 | | .0001 | | 3×10$^{12}$ |
| m-chlorophenyl m-phenoxyphenyl ether | 5.04 | 5.04 | | .0071 | 3.1×10$^{10}$ |
| p-bis(p-chlorophenoxy) benzene | 5.97 | 5.98 | | .0026 | 6.7×10$^{10}$ |

The vapor pressures of the polyphenyl ethers employed as dielectric materials in the preparation of the capacitors of this invention are relatively low as compared to the diphenyl ethers. Diphenyl ether boils at about 498° F. at 760 mm. pressure. On the other hand, the polyphenyl ethers employed in the present invention, as shown in the following table, have relatively low vapor pressures even at temperatures above the boiling point of diphenyl ether.

*Table II*

| Compound: | Degrees F. for 100 mm. vapor pressure |
|---|---|
| m-Bisphenoxybenzene | 543 |
| o-Bisphenoxybenzene | 522 |
| p-Bisphenoxybenzene | 561 |
| Bis(m-phenoxyphenyl) ether | 685 |

It is apparent from the foregoing that diphenyl ether cannot be used satisfactorily as a dielectric material for capacitors when the temperature of use is of the order of about 500° F. or higher. Thus, it was surprising to discover that the disclosed class of polyphenyl ethers employed in the present invention had both exceptionally low vapor pressures and excellent dielectric characteristics, whereby they are especially suited for high temperature applications. Additionally this class of polyphenyl ethers possess excellent thermal stability and resistance to oxidation, whereby they are particularly adapted to be employed in capacitor units which may be subjected to high temperatures of 500° to 800° F. and higher.

In addition to the use of the disclosed class of polyphenyl ethers as dielectric materials in the fabrication of electrical capacitors, the excellent electrical and thermal properties of these polyphenyl ethers also enables their application as electrical insulating and cooling media for transformers, cables, switches and other electrical apparatus, and as coating and impregnating compositions for paper, fabric, and other porous materials, which, in addition to their use in capacitors, can be employed for wrapping electrical cables, etc. Furthermore, it is not essential that a single specific polyphenyl ether be employed in the aforesaid applications, but a mixture of two or more of these compounds can be employed as desired.

We claim:

1. An apparatus comprising electrical conducting elements situated in spaced relationship with respect to each other and being adapted to provide an electrical potential therebetween and a dielectric material interposed between said elements consisting essentially of a linear poly(oxyphenylene)benzene containing at least two oxyphenylene groups together with the terminal phenyl radical having the structural formula

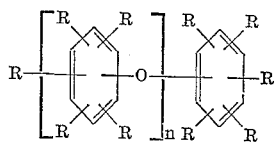

wherein $n$ is an integer from 2 to 9, inclusive, and each R group is selected from the group consisting of hydrogen, halogen, nitrile, phenyl, and alkyl.

2. The apparatus of claim 1, wherein the dielectric material is a halogen-containing poly(oxyphenylene)benzene and the halogen atoms have an atomic number up to 35.

3. The apparatus of claim 1, wherein the dielectric material is a chlorine-containing poly(oxyphenylene)benzene.

4. The apparatus of claim 1, wherein the dielectric material is an alkyl-substituted poly(oxyphenylene)benzene and said alkyl substituent contains up to 12 carbon atoms.

5. The apparatus of claim 1, wherein the dielectric material is an unsubstituted poly(oxyphenylene)benzene.

6. The apparatus of claim 1, wherein the dielectric material is m-chlorophenyl m-phenoxyphenyl ether.

7. The apparatus of claim 1, wherein the dielectric material is p-bis(p-chlorophenoxy)benzene.

8. The apparatus of claim 1, wherein the dielectric material is bis(m-phenoxyphenyl) ether.

9. A method of preventing power leakage between electrical conducting elements of a capacitor consisting of impregnating porous dielectric sheets with a linear poly(oxyphenylene)benzene dielectric material having the structural formula

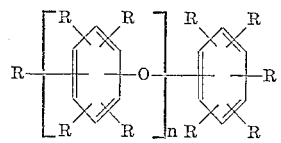

wherein $n$ is an integer from 2 to 9, inclusive, and each R group is selected from the group consisting of hydrogen, halogen, nitrile, phenyl, and alkyl, interleaving the impregnated sheets with a plurality of sheets of metal foil electrical conducting elements, rolling the interleaved insulated spaced electrical conducting element assembly, placing said assembly in a container, connecting electrical wire to the metal foil elements, and sealing the assembly in the container.

10. The method of claim 9, wherein the dielectric material is a halogen-containing poly(oxyphenylene)benzene and the halogen atoms have an atomic number up to 35.

11. The method of claim 9, wherein the dielectric material is a chlorine-containing poly(oxyphenylene)benzene.

12. The method of claim 9, wherein the dielectric material is an alkyl-substituted poly(oxyphenylene)benzene and said alkyl substituent contains up to 12 carbon atoms.

13. The method of claim 9, wherein the dielectric material is an unsubstituted poly(oxyphenylene)benzene.

References Cited in the file of this patent

UNITED STATES PATENTS

| 2,028,081 | Stoesser | Jan. 14, 1936 |
| 2,079,279 | Coleman et al. | May 4, 1937 |
| 2,169,995 | Coleman et al. | Aug. 22, 1939 |
| 2,464,877 | Markarian et al. | Mar. 22, 1949 |

OTHER REFERENCES

Kotera: Chemical Abstracts, vol. 45 (1951), pp. 2733c and 6598c.